(12) United States Patent
McCann et al.

(10) Patent No.: US 8,898,770 B2
(45) Date of Patent: Nov. 25, 2014

(54) ACCESSING CONTACT RECORDS IN A DEVICE WITH MULTIPLE OPERATION PERIMETERS

(75) Inventors: Robert Emmett McCann, Seattle, WA (US); Diana Jo Schwend, Seattle, WA (US); Hieu Le, Lynnwood, WA (US); Stephen Patrick Newman, Poulsbo, WA (US); Benjamin John Turner, Seattle, WA (US); Atiq Ur Rehman Awan, Ottawa (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/635,135

(22) PCT Filed: Aug. 10, 2012

(86) PCT No.: PCT/US2012/050325
§ 371 (c)(1),
(2), (4) Date: Sep. 14, 2012

(87) PCT Pub. No.: WO2014/025359
PCT Pub. Date: Feb. 13, 2014

(65) Prior Publication Data
US 2014/0047537 A1 Feb. 13, 2014

(51) Int. Cl.
*G06F 9/00* (2006.01)
(52) U.S. Cl.
USPC .............................. 726/19; 726/21
(58) Field of Classification Search
CPC ....... G06F 21/31; G06F 21/36; G06F 21/575; G06F 21/83; G06F 21/32; G06F 3/0488
See application file for complete search history.

(56) References Cited

U.S. PATENT DOCUMENTS

| | | | |
|---|---|---|---|
| 7,797,293 B2 | 9/2010 | Pabla et al. | |
| 7,797,524 B2 | 9/2010 | Chang et al. | |
| 7,831,141 B2 | 11/2010 | Wassingbo et al. | |
| 7,953,759 B2 | 5/2011 | Grossman et al. | |
| 7,996,468 B2 | 8/2011 | Cheah | |
| 8,171,093 B2 | 5/2012 | Ratnakar | |
| 8,180,654 B2 * | 5/2012 | Berkman et al. | 705/3 |
| 8,195,711 B2 | 6/2012 | Grossman et al. | |
| 8,201,263 B2 | 6/2012 | Apelqvist | |
| 2005/0065823 A1 * | 3/2005 | Ramraj et al. | 705/3 |
| 2005/0138110 A1 | 6/2005 | Redlich et al. | |
| 2006/0234680 A1 | 10/2006 | Doulton | |

(Continued)

OTHER PUBLICATIONS

PCT Search Report and Written Opinion, PCT/US2012/050325, European Patent Office, Nov. 20, 2012.

*Primary Examiner* — Kambiz Zand
*Assistant Examiner* — Ghodrat Jamshidi

(57) ABSTRACT

A method and apparatus for accessing contact records in an electronic device with multiple operation perimeters is provided. When accessing contact records from within one operation perimeter, only contact information accessible from that operation perimeter is retrieved. An option is provided to also access contact records of an alternative operation perimeter. If the alternative operation perimeter has a higher security level than the current operation perimeter, a password or other authorization may be required. The contact records may be accessed, for example, to find information for an outgoing communication, to identify information associated with an incoming communication, or to edit a contact record.

21 Claims, 9 Drawing Sheets

(56) References Cited

U.S. PATENT DOCUMENTS

| | | |
|---|---|---|
| 2006/0242422 A1 | 10/2006 | Hong et al. |
| 2008/0240702 A1* | 10/2008 | Wassingbo et al. ........... 396/310 |
| 2010/0146639 A1 | 6/2010 | Kim et al. |
| 2010/0304725 A1 | 12/2010 | Gueron et al. |
| 2011/0035673 A1 | 2/2011 | Chou et al. |
| 2012/0157166 A1 | 6/2012 | Kim et al. |
| 2013/0055378 A1 | 2/2013 | Chang et al. |
| 2013/0111579 A1 | 5/2013 | Newman et al. |

\* cited by examiner

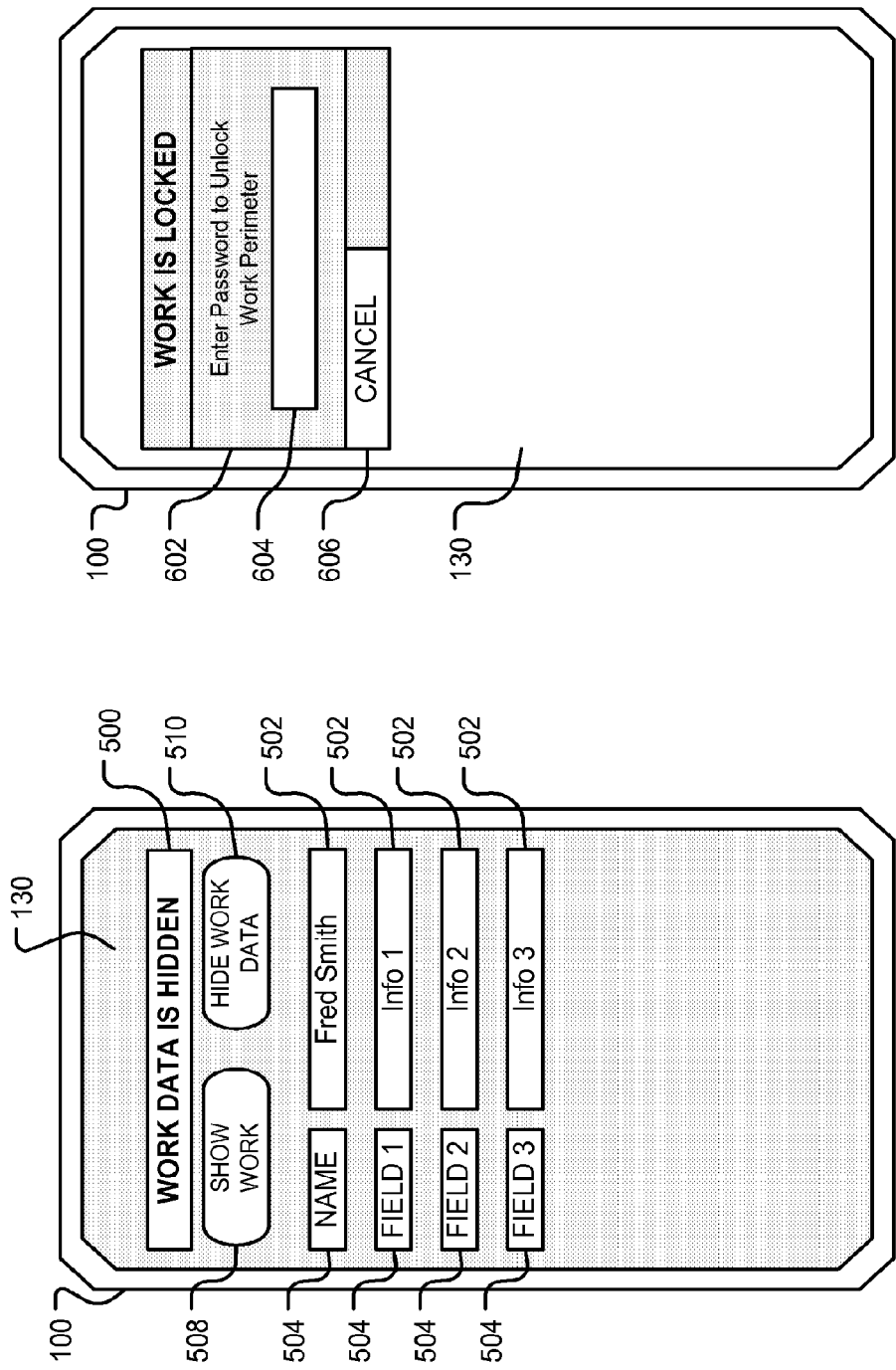

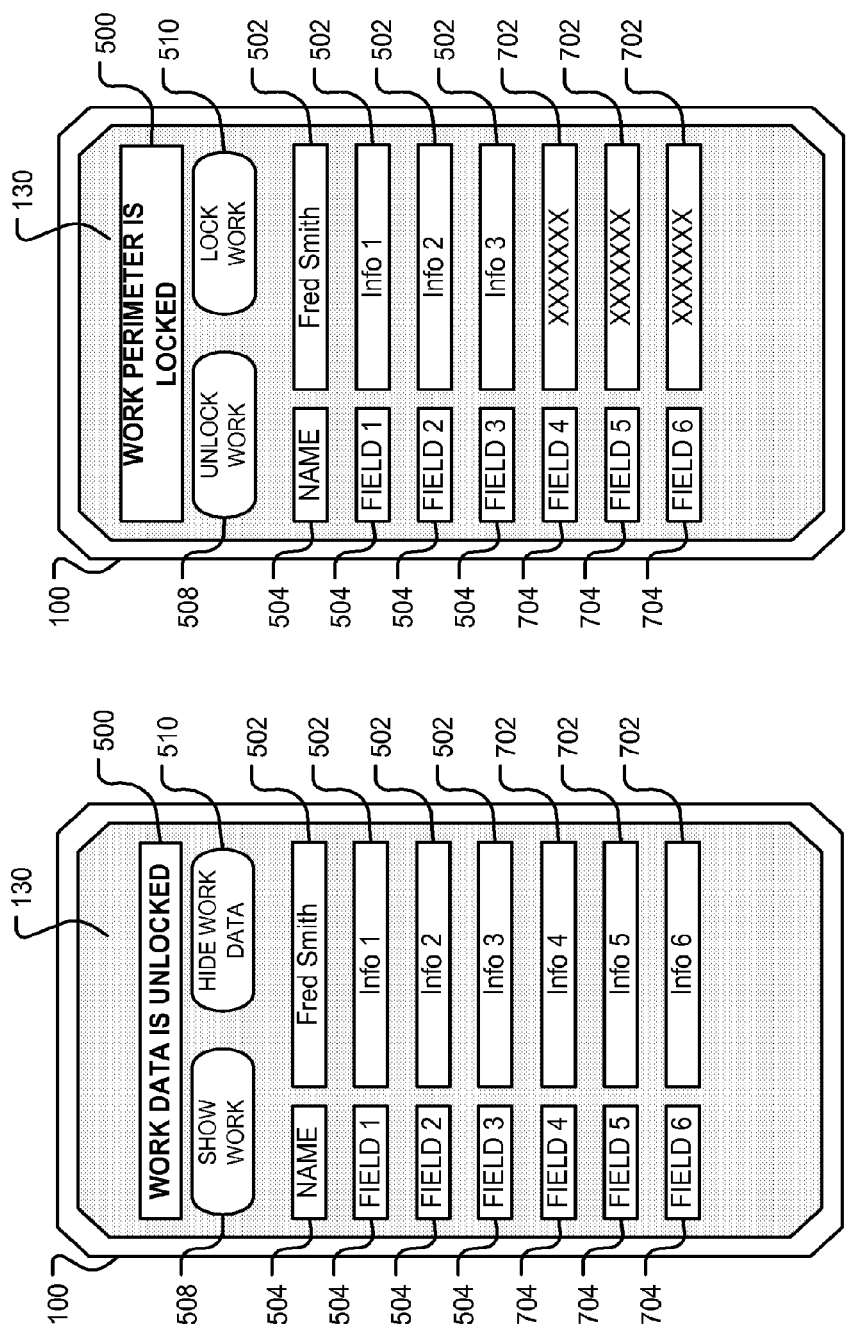

| FIELD NAME | DATA ENTRY | PERIMETER ACCESSIBILITY TAGS | | |
|---|---|---|---|---|
| | | PERSONAL | SOCIAL | WORK |
| NAME | Fred Smith | Y | Y | Y |
| ADDRESS 1 | 1 Main St. | N | N | Y |
| ADRESS 2 | Mytown | N | N | Y |
| ADDRESS 3 | Mystate | N | N | Y |
| EMAIL | name@address.com | N | N | Y |
| FACEBOOK | fb_address | Y | Y | N |
| TELEPHONE | 012-345-6789 | N | N | Y |
| IMAGE | mypic.jpg | Y | Y | N |
| IM | im_address | N | Y | N |
| TWITTER | twitter_address | N | Y | N |

ACCESSING CONTACT RECORDS IN A DEVICE WITH MULTIPLE OPERATION PERIMETERS

This application, which is a National Phase Entry of PCT Application No. PCT/US2012/050325 filed on Aug. 10, 2012, is related to co-pending U.S. patent application Ser. No. 13/635,110, filed on the same date, which is itself a National Phase Entry of PCT Application No. PCT/US2012/050318 also filed on Aug. 10, 2012.

BACKGROUND

Electronic devices, such as tablet computers or smart-phones, may be used for both personal and work activities. It may be useful to protect work data, which may be confidential or proprietary, from being mixed with personal data.

It may be useful for some data, such as contact records, to be accessible from within multiple operation perimeters. For example, both personal and work contact information might be stored for the same contact entity. It would be useful to provide a way to effectively and securely manage the retrieval and display of contact records in an electronic device with multiple operation perimeters.

BRIEF DESCRIPTION OF THE DRAWINGS

Example embodiments of the present disclosure will be described below with reference to the included drawings such that like reference numerals refer to like elements and in which:

FIGS. 5-8 are illustrative diagrams of user interfaces displayed on an electronic device in accordance with some example embodiments;

DETAILED DESCRIPTION

Figure 1:
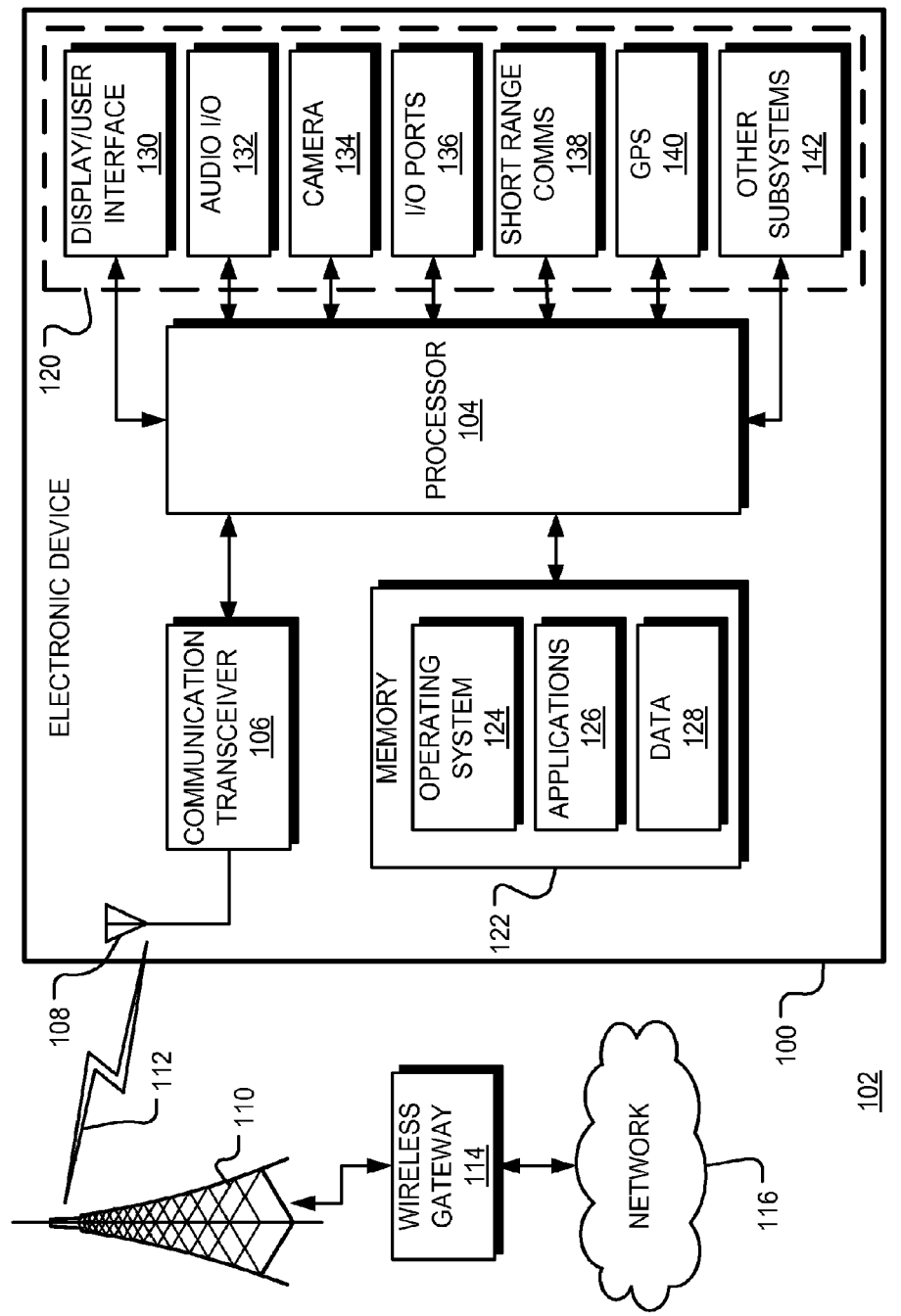
FIG. 1 is a block diagram of an electronic device in accordance with some example embodiments.

For simplicity and clarity of illustration, reference numerals may be repeated among the figures to indicate corresponding or analogous elements. Numerous details are set forth to provide an understanding of the illustrative example embodiments described herein. The example embodiments may be practiced without these details. In other instances, well-known methods, procedures, and components have not been described in detail to avoid obscuring the disclosed example embodiments. The description is not to be considered as limited to the scope of the example embodiments shown and described herein.

Electronic devices, such as tablet computers or smart-phones, may be used for both personal and work activities. It may be desirable to protect work data, which may be confidential or proprietary, from being mixed with personal data. One way to protect data is for the operating system of an electronic device to implement 'operation perimeters', which define environments, spaces or domains within which some data are accessible while others are not. When operating within one operational perimeter, access to data outside of the perimeter is controlled. For example, data related to personal contacts may be separated from data related to work contacts.

In addition, it may be advantageous for some data, such as contact records, to be accessible from within multiple operation perimeters. For example, both personal and work contact information might be stored for the same contact entity.

One example embodiment relates to the access of contact records on an electronic device, where the electronic device provides protected resources only accessible from within a controlled operation perimeter. The electronic device may be, for example, a tablet computer, smart-phone, personal computer, laptop computer, handheld device, PDA, pager or other processor-based device.

One example embodiment relates to an electronic device that includes a processor that may be operated within a first operation perimeter and within a second operating perimeter. The electronic device also includes at least one storage resource for storing a contact record that includes first contact information accessible from within the first operation perimeter and second contact information accessible from with the second operation perimeter. The processor may be operated to retrieve the first contact information from a storage resource if the electronic device is operating within the first operation perimeter and to retrieve the second contact information from a storage resource if the electronic device is operating within the second operation perimeter.

In one example embodiment, the electronic device includes a first storage resource that is accessible from the within the first operation perimeter for storing the first contact information, and a second storage resource, which is accessible from within the second operation perimeter but not from within the first operation perimeter, for storing the second contact information. The second storage resource may be a protected resource in a memory of the electronic device, for example.

The electronic device may also include a network interface that is accessible from within the second operation perimeter. In one example embodiment the second storage resource comprises a remote memory accessible via the network interface.

FIG. 1 is a block diagram of an electronic device in accordance with example embodiments. The electronic device may be, for example, a tablet computer, smart-phone, personal computer, laptop computer, handheld device, PDA, pager or other processor-based device. In the example embodiment shown in FIG. 1, the electronic device 100 is part of a communication system 102. The electronic device 100 includes a processor 104 that controls operation of the device. A network interface, including communication transceiver 106 and antenna 108, couples the electronic device to a wireless network 110 via wireless link 112. The wireless network 110 may further couple, via a wireless gateway 114, to a network 116 such as the Internet. In addition to the transceiver 106, the processor has access to a variety of additional resources, including peripheral resources 120 and memory 122.

The processor 104 is controlled by instructions stored in memory 122. These include operating system instructions 124 and application instructions 126. The memory also stores data 128. The memory may be a persistent memory, such as flash memory. Non-persistent memory, such as random access memory (RAM) may also be included.

In addition to the memory 122 and the transceiver 106, the electronic device has additional peripheral resources 120, which may include, for example, a display and user interface 130 (which may be a touch sensitive display, for example), audio I/O 132 (such as loudspeaker, headphone output and microphone), a camera 134 (for e.g. still image and video capture), general data I/O ports 136, a short range communication sub-system 138, a Global Position System (GPS) sub-system 140 and other sub-systems 142 (which may include an integrated keyboard and/or removable media, for example).

Operation of the processor 104 is controlled by the operating system 124. In accordance with an example embodiment, the operating system implements one or more operation perimeters that control access to the transceiver 106, peripheral resources 120, and memory 122. When operating within one perimeter, access to device resources outside of the perimeter is controlled. For example, data security is provided by controlling access to storage resources outside of the perimeter. In particular, leakage of data across a perimeter may be prevented. In addition, some software applications may not be accessible from within all perimeters. An operation perimeter may be implemented using software modules (such as operating system 124), hardware modules, or a combination thereof, that work together to perform operations on the electronic device.

Figure 2:
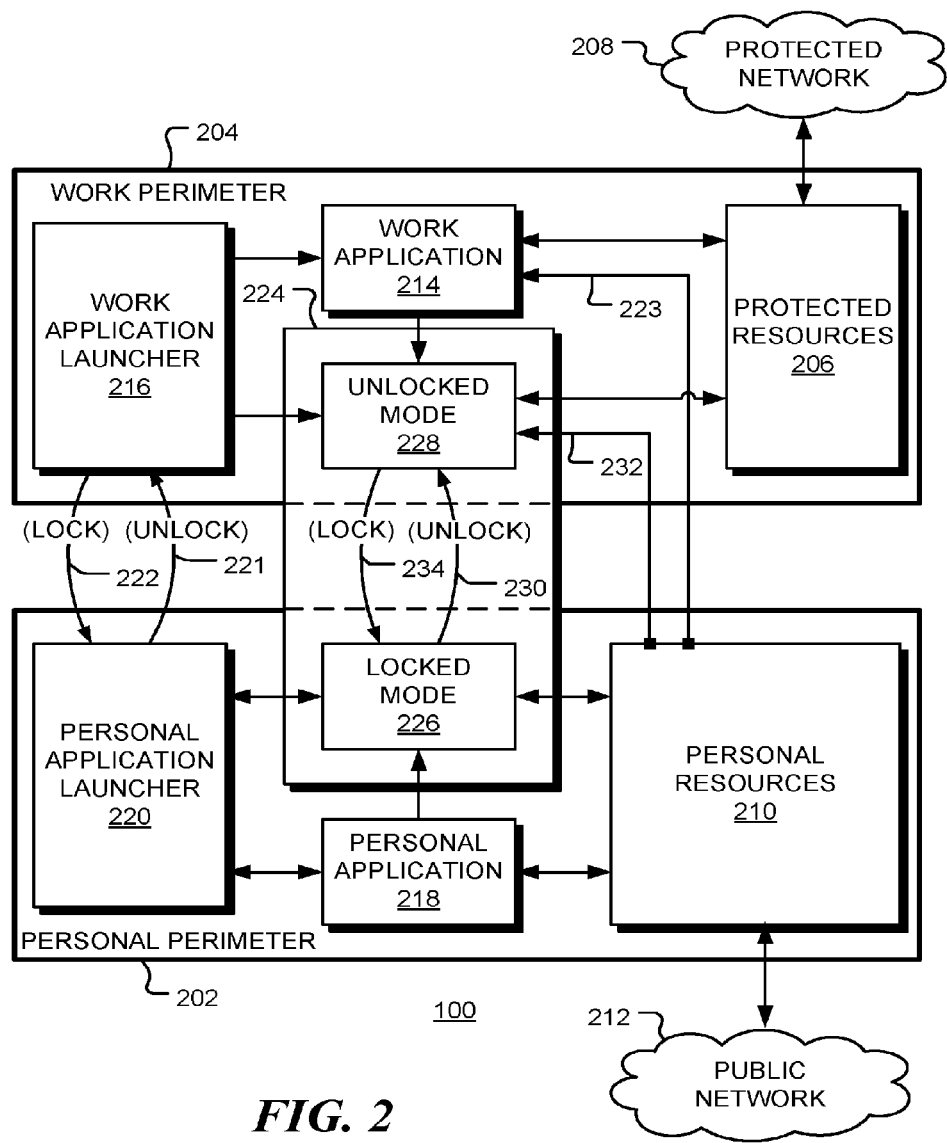
FIG. 2 is a block diagram illustrating operation perimeters of an electronic in accordance with some example embodiments.

FIG. 2 is a block diagram of an electronic device 100 having a first operation perimeter 202 and a second operation perimeter 204. In this example embodiment, the electronic device 100 may be operated within a work perimeter 204 or within a personal perimeter 202. The following description will refer to this example of work and personal perimeters. However, it is to be understood that more than two perimeters may be implemented and may have different associations. For example, different users of a device may each operate the device within their own perimeter or perimeters. Protected resources 206 include, for example, protected memory for storing work data and an interface with a protected network 208 for receiving or transmitting work data, whereas personal resources 210 include, for example, personal memory and an interface to a public network 212. The work perimeter 204 may also include one or more work applications 214, execution of which may be initiated by a work application launcher 216 (such as an icon-based or text-based directory application view). The personal perimeter 202 may also include one or more personal applications 218, execution of which may be initiated by a personal application launcher 220.

Work data, which is only accessible from within the work perimeter 204, may include documents, designs, numerical data, contacts, email messages, calendar entries. To help protect work data, the electronic device 100 creates the work perimeter 204 in its operating system to isolate work data, work applications and other work resources from personal data, personal applications and other personal resources. Work data may be encrypted for additional security.

Access to the interior of the work perimeter 204 is controlled by an authorization process, such as a password validation process. At initialization of the electronic device, the electronic device is operated within the personal perimeter 202 (or a perimeter having the lowest level of protection) and the work perimeter is 'locked', meaning that access to the work perimeter is not permitted without authorization. Personal application launcher 220 may be used to start personal applications 218 that have access to the personal resources 210. If a user wishes to access work applications, the work application launcher 216 may be accessed by 'unlocking' the work perimeter, as indicated by arrow 221. Access may be requested, for example, through user interaction with a user interface. Authorization may be achieved by validating a password entered by the user, or by some other authorization (such as biometric data input or gesture recognition etc.). Once inside the work perimeter 204, work applications 214 may be launched having access to the protected resources 206. Optionally, while the work perimeter is unlocked, the resources 210 may be accessed, as indicated by arrow 223, but only to retrieve information. Operation may be returned to the personal perimeter by locking the work perimeter as indicated by arrow 222. Locking may be initiated by the user or may occur automatically—such as after a set period of inactivity or a set time since the perimeter was unlocked.

In some example embodiments, it is useful for some applications, resources and/or data to be accessible from within more than one perimeter. An application accessible from within more than one perimeter is termed a shared or hybrid application. An example of a shared application is a contact manager application. Some contact information may need to be protected, while other contact information does not. In FIG. 2, shared application 224 is accessible from within both the work perimeter 204 and the personal perimeter 202. However, when accessed from within the personal perimeter 202, the shared application 224 operates in a locked mode 226. In the locked mode 226, the shared application 224 may only access the personal resources 210. Before the protected resources 206 can be accessed, the operating mode must be changed to an unlocked mode 228, as indicated by arrow 230. As described above, authorization to unlock must be validated. Once in unlocked mode 228, the shared application 224 can access the protected resources 206. Optionally, the resources 210 may be accessed, as indicated by arrow 232, but only to retrieve information. Operation of the shared application 224 may be returned to the locked mode as indicated by arrow 234.

To prevent data leakage from the protected resources to the personal resources, application data is stored in protected resources when the shared application 224 is operated in the unlocked mode 228. Thus, no protected data is available to the application when it returns to the locked mode 226.

An example of a shared application is a contact manager. A contact manager may be launched by user interaction with a user interface, or the contact manager may be launched or its contact records accessed by another application, such as an email application or a phone application. For example, an email application may launch a contact manager (or access its contact records) to display email addresses for selection within an email application. In another example, a phone application may launch a contact manager (or access its contact records) to provide caller identification information corresponding to the telephone number of an incoming call from a contact in a contact record of the contact manager. The contact manager and its contact records may be accessible from within more than one perimeter. A contact manager may be used to search a database of contact records, to add new contact records or edit existing contact records.

Contact information, in the form of contact records, may be stored within one or more perimeters. Contact information includes, for example, information such as names, aliases, email addresses, work and home addresses, telephone numbers, fax numbers, instant messaging (IM) addresses and web addresses of contacts. Contact information may be stored in a single record or in multiple linked records. Linked records may have one or more common data fields or a common index. In particular, different parts of a contact record may be stored within different perimeters.

In accordance with one example embodiment, when retrieving a contact record from within one operation perimeter, an option is provided by a contact manager (via a user interface) to also retrieve contact information that is only accessible from within an alternative operation perimeter. If the alternative operation perimeter has a higher security level than the current operation perimeter, a password or other authorization may be required.

Figure 3:
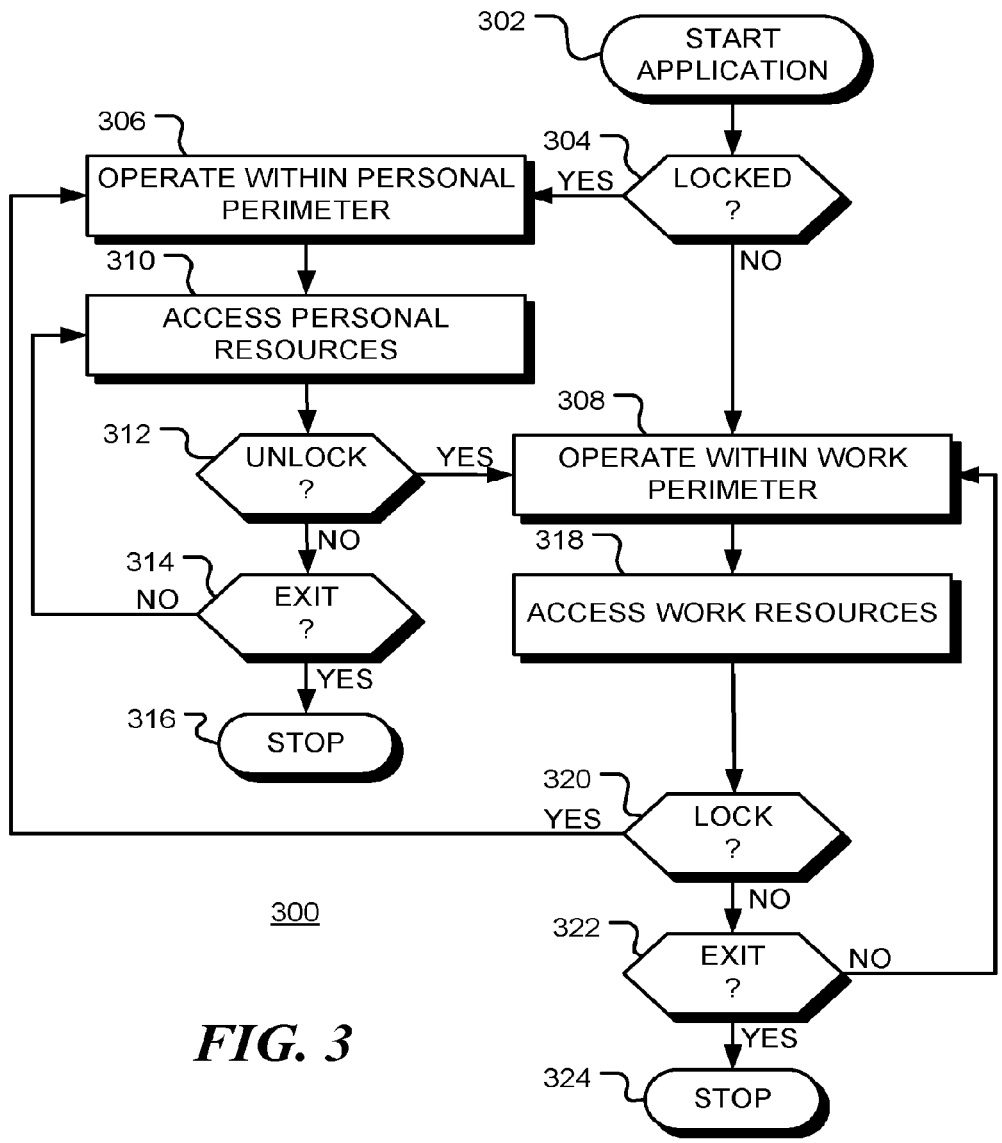
FIG. 3 is a flow chart of a method of operation of a shared application in accordance with some example embodiments.

FIG. 3 is a flow chart of a method 300 of operation of a shared application in accordance with some example embodiments. In this example embodiment, two perimeters—work and personal—are implemented, but other perimeters could be implemented in other example embodiments. The shared application is launched at start block 302. If the work perimeter is locked, as depicted by the positive branch from decision block 304, the shared application is operated in a locked mode within the personal perimeter at block 306. If the work perimeter is unlocked, as depicted by the negative branch from decision block 304, the shared application is operated in an unlocked mode within the work perimeter at block 308. When operating within the personal perimeter, the shared application may access only personal resources within the personal perimeter, as depicted by block 310. If the application wishes to access a resource within the work perimeter or the user wishes to switch to an unlocked mode of operation, the work perimeter must be unlocked as depicted by the positive branch from decision block 312. For example, if the user wishes to retrieve data from a protected resource, the user may be prompted via a user interface to enter a password or other authorization. The work perimeter is only unlocked if the authorization is validated. Alternatively, a user may indicate via a user interface a desire to operate within the work perimeter. Again, the user is prompted to input an authorization. If the perimeter remains locked, as depicted by the negative branch from decision block 312, flow continues to decision block 314. From decision block 314, flow returns to block 310 unless the application is exited. If the application is exited, as depicted by the positive branch from decision block 314, the method stops at block 316.

When operating within the work perimeter, as depicted by block 308, the shared application may access work resources within the work perimeter, as depicted by block 318. Optionally, the shared application may also retrieve information from resources within the personal perimeter. The shared application may switch to a locked mode of operation, within the personal perimeter, as depicted by the positive branch from decision block 320. This switch may be requested by the user or may be caused automatically when a set criterion is satisfied. For example, the switch may occur once an application has been inactive for a set time. Prior to an automatic switch, the user may be prompted to enter an authorization to remain in the unlocked mode of operation. If the authorization is validated, or if no switch is has been requested, operation continues in the unlocked mode as depicted by the negative branch from decision block 320. If the shared application has been terminated, as depicted by the positive branch from decision block 322, the method terminates at block 324. Otherwise, as depicted by the negative branch from decision block 322, flow continues to block 308 and the shared application continues to operate in the unlocked mode within the work perimeter. In this way, a shared application may be moved between a work mode and a personal mode.

Figure 4:
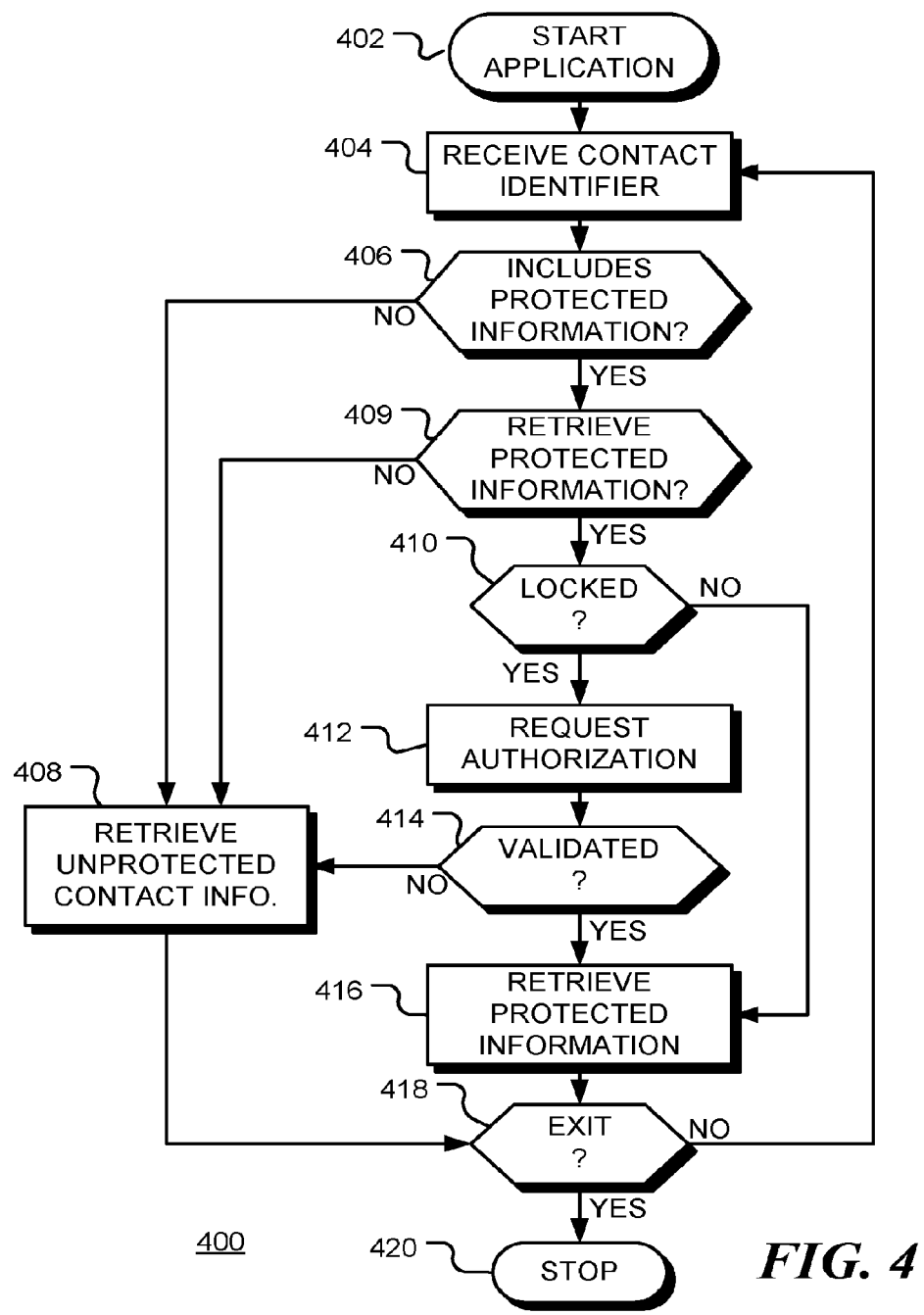
FIG. 4 is a flow chart of a method for accessing a contact record on an electronic device in accordance with some example embodiments.

FIG. 4 is a flow chart of a method 400 for accessing a contact record on an electronic device in accordance with an example embodiment. The electronic device is configured to operate within first and second operation perimeters, the second perimeter having a protected resource that has restricted access from within the first operation perimeter. At start block 402 execution of an application, such as a contact manager, is initiated by a user or by an application executing on the electronic device. At block 404 a contact identifier is received. The contact identifier identifies the contact to be accessed and may be, for example, an index to a database of contact records or a field entry to be searched for. (In an example, the contact identifier is a last name of a contact in a contact record of the contact manager, which is received at the contact manager, from an email application which requests an email address corresponding to the last name of the contact. In another example, the contact identifier is a phone number of a contact in a contact record of the contact manager, which is received at the contact manager, from a phone application which requests caller identification information corresponding to the phone number.) The index may be discovered by searching the database of contact records to match a data entry in one of more fields of the contact record, for example. The contact identifier may be determined in response to data entered through user interaction with a user interface, such as a touch screen, keyboard or voice interface, or a data interface, such as network connection. If, as depicted by the negative branch from decision block 406, the contact record associated with the contact identifier does not contain any protected information from within the second perimeter, flow continues to block 408, where one or more data entries of the contact record are retrieved. The retrieved data entries may be displayed to the user or used by an application. If, as depicted by the positive branch from decision block 406, the contact record associated with the contact identifier contains some protected information, flow continues to decision block 409, where it is determined if the protected information is to be retrieved. If the protected information is not be retrieved, as depicted by the negative branch from decision block 409, flow continues to block 408. Otherwise, as depicted by the positive branch from decision block 409, flow continues to decision block 410 where it is determined if the second perimeter is locked. If the second perimeter is locked, as depicted by the positive branch from decision block 410, an authorization is requested at block 412. The authorization request may include displaying a message on a display of the electronic device to prompt the user to enter a password. If, as depicted by the positive branch from decision block 414, the authorization is validated, for example by comparing an entered password to a password stored on the electronic device or at a remote location accessible via a network, the protected information of the contact record is retrieved at block 416 and may be displayed to the user or used by an application. If the authorization is not validated, as depicted by the negative branch from decision block 414, flow continues to block 408 and only the unprotected contact information is retrieved. Alternatively, the user may be prompted to re-enter the password or take some other action. If the application has not been terminated, as depicted by the negative branch from decision block 418, flow continues to block 404 and another contact record may be accessed. If the application has been terminated, as depicted by the positive branch from decision block 418, the method ends at block 420.

The protect contact information may be stored in a protected resource that is a storage resource such as a local or remote memory. For example, the protected contact record may be stored in a storage resource of the second operation perimeter.

Once the authorization is validated for the second operation perimeter at block 414, the electronic device may be operated within the second operation perimeter.

Multiple operation perimeters may be implemented, each having an associated authorization. The operation perimeters may have a flat structure, a hierarchical structure, or a combination thereof.

The method for retrieving contact information may be implemented in software or a combination of hardware and software on an electronic device having a first operation perimeter and a second operation perimeter. In accordance with the method, a contact record is accessed in response to a received contact identifier, the contact record including first contact information accessible from within the first operation perimeter and second contact information accessible from within the second operation perimeter. The first contact information is retrieved if the electronic device is being operated within the first operation perimeter and the second contact information is retrieved if the electronic device is operating within the second operation perimeter.

If the electronic device is operating within the first operation perimeter, the electronic device may indicate, via a user interface of the electronic device, that second contact information is available. If it is determined that the second contact information is be retrieved, an authorization is requested for the second operation perimeter. If it is determined that the provided authorization is valid for the second operation perimeter, the second contact information is retrieved, and the electronic device may be operated within the second operation perimeter. The authorization request may include a request for a password associated with the second operation perimeter.

The contact identifier may be received from a user interface of the electronic device, from an application executed on the electronic device or may be associated with an incoming or outgoing communication, for example.

In one example embodiment, the first contact information is stored in a storage resource within the first operation perimeter and the second contact information is stored in a storage resource within the second operation perimeter. In this example embodiment the first contact information may include a link to the second contact information.

The retrieved information may be displayed on a display of the electronic device.

FIG. 5 is an illustrative diagram of an electronic device 100 in accordance with an example embodiment. The electronic device 100 includes a display and user interface 130. When a contact manager application or other application is executed to retrieve information from a contact record, some of the information is shown on the display and user interface 130. A status bar 500 may be displayed to indicate the current operating mode of the electronic device. In the example embodiment shown, the electronic is operating within a personal perimeter, so the status bar 500 indicates that work related contact information, which cannot be accessed from within the personal perimeter, is hidden from view. Personal contact information retrieved from the contact record is displayed in boxes 502. Each box 502 is associated with a data field of a contact record. Data fields may include addresses, telephone number, email addresses, IM addresses, web addresses and the like. The data field names are displayed as text or icons 504 on the display 130.

If, as indicated by the status bar 500, the work related contact information is hidden because the work perimeter is locked, a user may select to show the hidden contact information by activating button 508. The button 508 may be labelled in a variety of ways, such as text labels 'show hidden contacts' or 'unlock work perimeter', for example, or by an icon or symbol. Activating button 508 initiates an authorization process that is used to unlock the work perimeter, and a new screen is displayed on the display 130, as depicted in FIG. 6. Button 510 is inactive since work data is already hidden. The authorization process may cause the electronic device to switch to operation within the work perimeter, or it may only allow the contact application to access the resources within the work perimeter.

FIG. 6 is an illustrative diagram of an electronic device 100 showing an example embodiment of a request for authorization to unlock a work perimeter. A display box 602 informs the user that work perimeter is currently locked and instructs the user to enter a password into edit box 604 or to cancel the request by selecting button 606. The password may be entered using keyboard 506, for example. Once entered, the password is validated against a stored password and, if validated, the protected contacted information is retrieved and may be displayed, as depicted in FIG. 7. Other kinds of authorization may be used, including biometric data (such as finger prints, retina scans, voice recognition) or gesture inputs (such as signature recognition).

FIG. 7 is an illustrative diagram of an electronic device 100 in accordance with an example embodiment. Display and user interface 130 shows a status bar 500 indicating that the work perimeter and the data contained therein is unlocked. Personal contact information retrieved from the contact record is displayed in boxes 502. Each box 502 is associated with a data field of a contact record. The data field names are displayed as text or icons 504 on the display 130. In addition, protected contact information from within the work perimeter is displayed on boxes 702, along with corresponding field names 704. Button 510 may be selected to return to operation within the personal perimeter. If button 510 is selected, the contact information in boxes 702 will again be hidden. Button 508 is inactive since the work data is already shown.

In an alternative example embodiment, shown in FIG. 8, work contact information is hidden when the electronic device 100 is operated within the personal perimeter. Hidden data is indicated by the text 'XXXXXXX' in the boxes 702. Other indicators, such as the text 'HIDDEN' or a blank field could also be used to indicate hidden data. However, the field names 704 of the hidden data are shown. In this example embodiment, the status bar 130 indicates that the work perimeter is locked, which implies that contact information within the work perimeter is hidden. This view informs the user that the some contact information is hidden and also informs the user which data fields are hidden. In another example embodiment field names 704 corresponding to the hidden data are not shown. The work perimeter may be unlocked by activating button 508, which causes the screen shown in FIG. 6 to be displayed. When the work perimeter is unlocked, protected contact information is displayed in boxes 702. The work perimeter may be locked again by activating button 510.

Figures 9, 10:
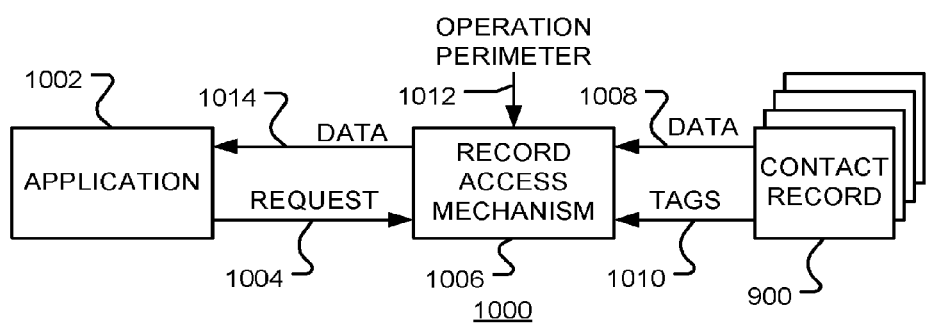
FIG. 9 is an illustrative diagram of a contact record of an electronic device in accordance with some example embodiments.
FIG. 10 is a block diagram of a system for accessing contact records of an electronic device in accordance with some example embodiments.

FIG. 9 is a representation of a contact record 900 in accordance with an illustrative example embodiment of the invention. The contact record 900 may be stored in a memory of the electronic device. The contact record is structured as a number of data fields 902. Each data field 902 contains a field name or label 904, a data entry 906 and one or more perimeter accessibility tags 908, 908' and 908". The field names 904 indicate the type of information contained in the data field provide a common structure for contact records. Other data fields may be used, such as: Name, Alias, Photograph, Date of Birth, Delivery Address, Label Address, Telephone, Email, Time Zone, GPS location, Title, Role or occupation, Logo, Agent, Organization Name, Note, Revision Date, Sound, URL, Unique Identifier, and/or Public Encryption Key, for example.

The data entries 906 include information, such as text or numeric values, for each data field. The perimeter accessibility tags 908 indicate whether the associated data field is accessible from within the personal perimeter. In this illustration, 'Y' (yes) indicates that it is accessible, and 'N' (no) indicates that it is not accessible. Similarly, the perimeter accessibility tags 908' indicate whether the corresponding data entry is accessible from within a social perimeter and the perimeter accessibility tags 908" indicate whether the associated data field is accessible from within the work perimeter. The use of accessibility tags in each data field allows all the contact information to be stored in a single contact record.

In a further example embodiment, each data field 902 includes a single perimeter accessibility tag 908, indicating if the data entry 906 is protected or not.

FIG. 10 is a block diagram of a system for retrieving contact information in an electronic device having one or more operation perimeters. The system 1000 includes an application 1002 that send a request 1004 to a record access mechanism 1006. The application 1002 may be a contact manager application or a communication module, for example. The application 1002 may be a contact picker component that is callable from other applications, such as email applications or telephone applications, to enable selection of a contact record. The contact records may be accessed to find information for an outgoing communication, to identify information associated with an incoming communication, or for editing a contact record. The request 1004 may include a contact identifier, which indicates which contact record is to be accessed, and one or more permissions. The permissions indicate to the record access mechanism 1006 which types of records may be accessed by the application 1002. In response to the received contact identifier, the record access mechanism retrieves contact data 1008 and/or accessibility tags 1010 from a contact record 900. The record access mechanism 1006 may also be responsive to the operation perimeter status 1012, which indicates the current operation perimeter. Based upon the tags 1010, the operation perimeter status 1012 and the permissions 1004, the record access mechanism 1006 determines if the data 1008 should be retrieved and passed to the application 1002. For example, if the contact record 900 includes first contact information accessible from within a first operation perimeter and second contact information accessible from within a second operation perimeter, first contact information may be retrieved if the electronic device is operating within the first operation perimeter and second contact information may be retrieved if the electronic device is operating within the second operation perimeter.

If the electronic device is operating within the first operation perimeter, the electronic device may indicate, via a user interface, that second contact information is available. If it is determined that the second contact information is be retrieved, an authorization for the second operation perimeter may be requested and the second contact information may be retrieved if the authorization is valid for the second operation perimeter. The electronic device may be operated within the second operation perimeter if the authorization is valid for the second operation perimeter. The authorization request may include a request for a password associated with the second operation perimeter.

The application 1002 may receive the contact identifier for request 1004 from a user interface of the electronic device, and the retrieved data 1014 may be displayed on the user interface.

Figure 11:
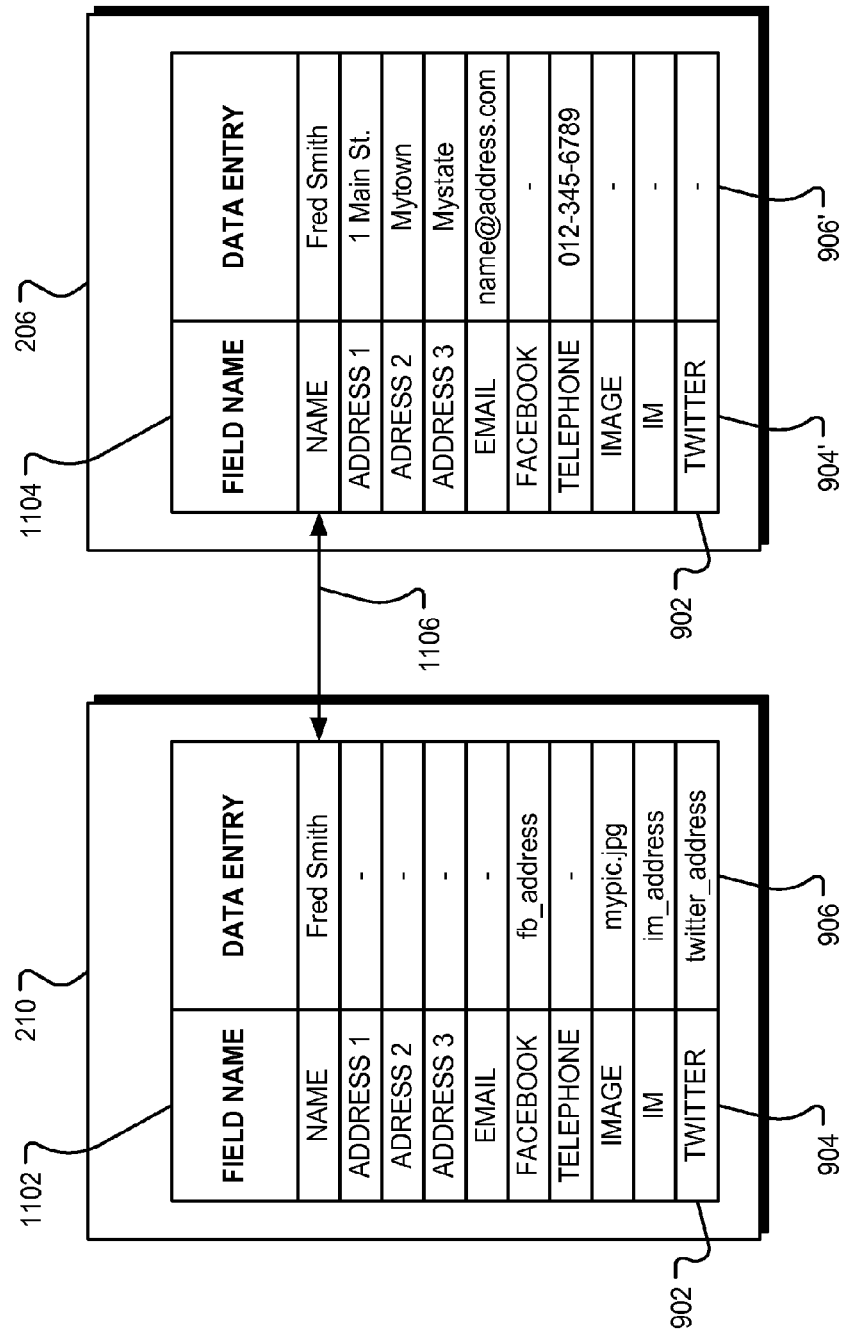
FIG. 11 is an illustrative diagram of linked contact records of an electronic device in accordance with some example embodiments.

FIG. 11 is a representation of linked contact records in accordance with an example embodiment of the invention. The contact records may be stored in one or more memories of the electronic device. The linked contact records include a first record 1102 stored in a resource 210 within the personal perimeter and a second record 1104 stored in a resource 206 within the work perimeter. The two records are linked. In this example, the NAME fields are linked, as indicated by the arrow 1106, so that the two records may be association with one another. Other fields may be linked. For example, a telephone number field may be linked to allow for caller identification. Each record is structured as a number of data fields 902. Each data field of the first record 1102 contains a field name or label 904 and a data entry 906. Each data field of the second record 1104 contains a field name or label 904' and a data entry 906'. If the first record 1102 has been retrieved, the second record may be found by searching for the NAME 'Fred Smith' amongst the records within the work perimeter. In this example, combination of the first and second records produces a complete contact record for a contact with NAME 'Fred Smith'. Using linked records allows storage of a contact record to be split between two regions of memory, between physically separate memories of the electronic device, between local and remote storage resources, or a combination thereof.

In one example embodiment, the unprotected part of the contact record is stored in a personal resource within the personal perimeter and protected part of the contact record is stored in a protected resource within the work perimeter. In this example embodiment, access to the protected resource is only granted once a requested authorization has been validated. For example, a colleague's name and home telephone number may be stored in a personal resource, while their work contact information may be stored in the protected resource. A common field or index may be used to link the two parts on of the contact record.

A caller identification (ID) application may be implemented on the electronic device. In one embodiment, a caller ID application searches the telephone number data fields of contact records to find contacts having the same telephone number as an incoming telephone call. If the work perimeter is locked, only contacts within the personal perimeter will be displayed. In one embodiment, if the work perimeter is locked and the contact record contains information from both the work perimeter and the personal perimeter, some or all of the personal contact information is displayed. In a further example embodiment, if the work perimeter is locked, no information is displayed if any of the contact record is protected within the work perimeter.

Some contacts in an address book may have merged work, personal and social information. For example, a contact can be a co-worker having a work address attribute. This contact can also be a Facebook friend having social attributes such as a Facebook user name, a Facebook e-mail and a Facebook profile picture. Contact information may be categorized as. work, personal, and social (Facebook, Twitter, LinkedIn), for example.

The entire contact record may be hidden if the application does not have permission for all of the contact's attributes (all the contact information in the contact record). For example, if an application lacks social permission but has work and personal permissions, and the contact has work and personal attributes, then the application hides the entire contact.

In a further example embodiment, if the application lacks social permission but has work and personal permissions, then the application hides social attributes of the contact but shows work and personal attributes of the contact.

Figure 12:
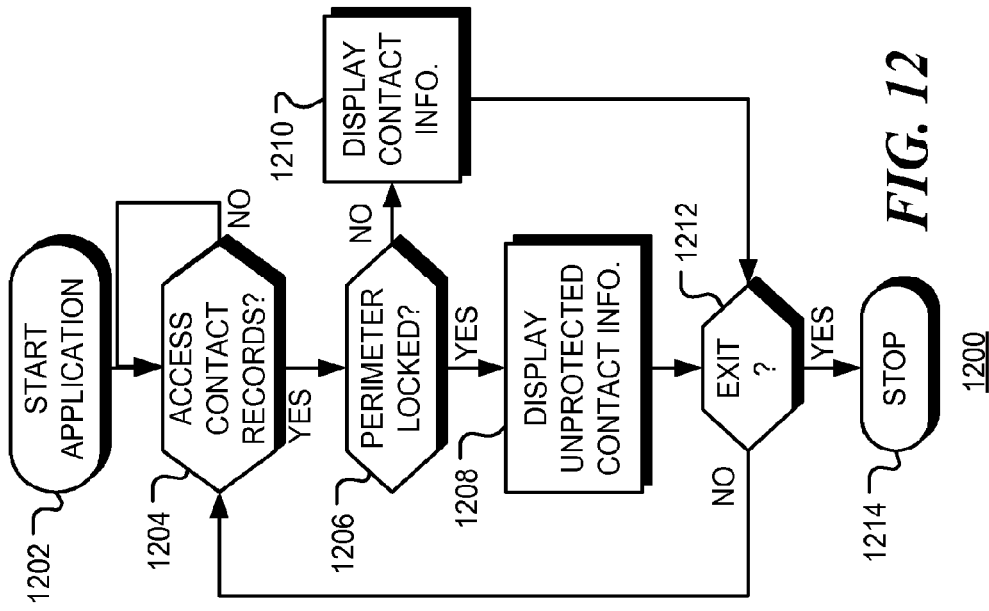

FIG. 12 is a flow chart of a method, implemented on an electronic device, for displaying contact information. The electronic device has a first operation perimeter and a second operation perimeter. Execution of an application for accessing contact records is initiated at start block 1202. Access may result, for example, from an incoming call that triggers a caller ID application, or from user interaction with a contact manager application or a contact picker application. If a contact record is to be accessed, as determined by the positive branch from decision block 1204, a contact record is accessed in response to receiving a contact identifier. The contact record includes first contact information accessible from within the first operation perimeter and/or second contact information accessible from within the second, protected, operation perimeter. If the electronic device is operating within the first operation perimeter, and the second, protected operation perimeter is locked, as depicted by the positive branch from decision block 1206, the first (unprotected) contact information is displayed at block 1208. (The protected contact information is not displayed). If the electronic device is operating within the second (protected) operation perimeter, as depicted by the negative branch from decision block 1206, the second operation perimeter is unlocked and the protected contact information is displayed at block 1210. Optionally, the unprotected contact information may also be displayed at block 1210. If the application is terminated, as depicted by the positive branch from decision block 1212, the method terminates at block 1214. Otherwise, as depicted by the negative branch from decision block 1212, flow returns to block 1204. In this way, protected work data is hidden from the user when the electronic device is operated within the personal operation perimeter. In a contact manager or contact picker application operated within the first operation perimeter, no protected contact information is displayed.

Figure 13:
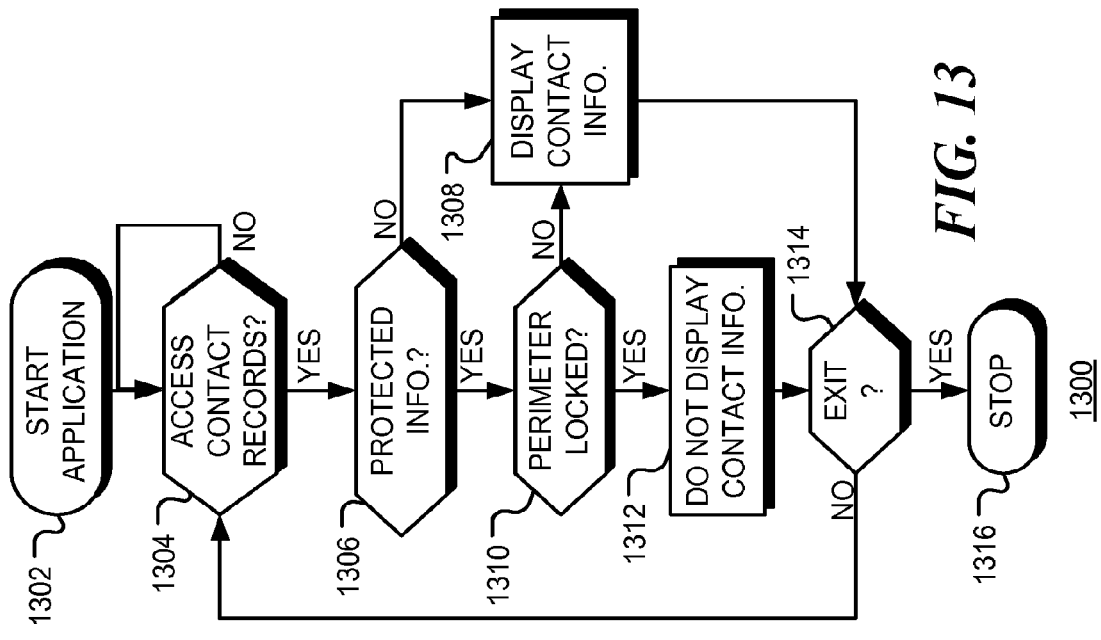
FIGS. 12 and 13 are flow charts of methods for displaying contact information on an electronic device in accordance with certain example embodiments.

FIG. 13 is a flow chart of a further method, implemented on an electronic device, for displaying contact information. Again, the electronic device has a first operation perimeter and a second (protected) operation perimeter. Execution of an application for accessing contact records is initiated at start block 1302. If a contact record is to be accessed, as determined by the positive branch from decision block 1304, a contact record is accessed in response to receiving a contact identifier. If the contact record does not include any protected contact information, accessible only from within the second operation perimeter, as depicted by the negative branch from decision block 1306, the contact information is displayed at block 1308. If, on the other hand, the contact records contains any protected information, as depicted by the positive branch from decision block 1306, flow continues to decision block 1310, where it is determined if the second operation perimeter is locked or unlocked. If the electronic device is locked, i.e. operating within the first operation perimeter, as depicted by the positive branch from decision block 1310, no contact information is displayed, as indicated by block 1312. If, however, the electronic device is unlocked, i.e. operating within the second operation perimeter, the contact information is displayed at block 1308. If the application is terminated, as depicted by the positive branch from decision block 1314, the method terminates at block 1316. Otherwise, as depicted by the negative branch from decision block 1314, flow returns to block 1304. In this way, protected work data is hidden from the user when the electronic device is operated within the personal operation perimeter. In a contact manager or contact picker application operated within the first operation perimeter, only contact records that contain no protected contact information are displayed.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The implementations of the present disclosure described above are intended to be merely examples. It will be appreciated by those of skill in the art that alterations, modifications and variations to the illustrative example embodiments disclosed herein may be made without departing from the scope of the present disclosure. Moreover, selected features from one or more of the above-described example embodiments may be combined to create alternative example embodiments not explicitly shown and described herein.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method, implemented on an electronic device, for retrieving contact information, the electronic device having a first operation perimeter and a second operation perimeter, and a communication transceiver that is operable to provide a wireless link to a communication network and enable a user of the electronic device to make contact with other entities using the communication network, the method comprising:

receiving at the electronic device, an incoming communication including a contact identifier of an entity, other than the user of the electronic device, with whom the user of the electronic device can communicate using the communication transceiver;

searching a database of contact records of a plurality of entities, dependent upon the received contact identifier, to discover a contact record associated with the contact identifier, where the discovered contact record comprises information related to the entity;

accessing the discovered contact record, dependent upon whether the electronic device is operating within a first operation perimeter or a second operation perimeter, the discovered contact record including first contact information of personal contacts of the user accessible from within the first operation perimeter and second contact information of work-related contacts of the user accessible from within the second operation perimeter;

retrieving the first contact information and displaying the first contact information to the user if the electronic device is operating within the first operation perimeter; and retrieving the second contact information and displaying the second contact information to the user if the electronic device is operating within the second operation perimeter, where the first operation perimeter is configured for personal activities and personal data of the user, the personal data including the first contact information, and the second operation perimeter is configured for work-related activities and work-related data of the user, the work-related data including the second contact information, and where the first and second operation perimeters operate to prevent the work-related data from being mixed with the personal data;

the method further comprising:

if the electronic device is operating within the first operation perimeter;

indicating, via a user interface of the electronic device, that second contact information is available;

if it is determined that the second contact information is to be retrieved;

requesting an authorization for the second operation perimeter;

determining if the authorization is valid and retrieving and displaying the second contact information if the authorization is valid for the second operation perimeter.

2. The method of claim 1, further comprising:

operating the electronic device within the second operation perimeter if the authorization is valid for the second operation perimeter.

3. The method of claim 1, where requesting an authorization comprises requesting a password associated with the second operation perimeter.

4. The method of claim 1, further comprising:

accessing the contact record in response to receiving a contact identifier from a user interface of the electronic device.

5. The method of claim 1, further comprising:

accessing the contact record in response to receiving a contact identifier from an application executing on the electronic device.

6. The method of claim 1, where the first contact information is stored in a first storage resource within the first operation perimeter and the second contact information is stored in a second storage resource within the second operation perimeter and where the first contact information comprises:

a link to the second contact information.

7. The method of claim 1, further comprising:

not displaying the second contact information if the electronic device is operating within the first operation perimeter.

8. The method of claim 1, where displaying the first contact information if the electronic device is operating within the first operation perimeter comprises:

displaying the retrieved first contact information if the contact record includes no second contact information within the second operation perimeter.

9. The method of claim 1, where displaying the first contact information if the electronic device is operating within the first operation perimeter comprises:

if the contact record includes second contact information: displaying only the first contact information.

10. The method of claim 1, wherein accessing a contact record comprises executing a caller ID application.

11. The method of claim 1, where the contact identifier comprises one or more of a telephone number, an email address, a fax number, an instant messaging address and a web address.

12. An electronic device comprising:

a communication transceiver operable to receive an incoming communication from an entity, other than a user of the electronic device, the incoming communication including a contact identifier of the entity;

a processor operable within a first operation perimeter and a second operating perimeter; and at least one storage resource operable to store a plurality of contact records, each contact record of the plurality of contact records associated with an entity and including first contact information of the entity accessible from within the first operation perimeter and second contact information of the entity accessible from with the second operation perimeter, where the processor is operable, in response to the incoming communication, to: search the plurality of contact records, dependent upon the contact identifier, to discover a contact record associated with the entity;

retrieve the first contact information of the discovered contact record from the at least one storage resource if the electronic device is operating within the first operation perimeter and display the retrieved first contact information to the user of the electronic device; and retrieve the second contact information of the discovered contact record from the at least one storage resource if the electronic device is operating within the second operation perimeter and display the retrieved second contact information to the user of the electronic device, where the first operation perimeter is configured for personal activities and personal data of the user, the personal data including the first contact information, where the second operation perimeter is configured for work-related activities and work-related data of the user, the work-related data including the second contact information, and where the first and second operation perimeters operate to prevent the work data from being mixed with the personal data;

the electronic device further comprising:

a user interface;

where, if the electronic device is operating within the first operation perimeter the processor is further operable to perform a method comprising:

indicating, via the user interface, that the second contact information is available;

if it is determined that the second contact information is to be retrieved;

requesting an authorization for the second operation perimeter;

determining if the authorization is valid; and retrieving the second contact information if the authorization is valid for the second operation perimeter.

13. The electronic device of claim 12, where the at least one storage resource comprises:

a first storage resource accessible from the within the first operation perimeter and operable to store the first contact information; and a second storage resource accessible from the within the second operation perimeter, inaccessible from within the first operation perimeter, and operable to store the second contact information.

14. The electronic device of claim 13, where the second storage resource comprises a protected memory of the electronic device.

15. The electronic device of claim 13, where the communication transceiver is accessible from within the second operation perimeter, and where the second storage resource includes a remote memory accessible via the communication transceiver.

16. The electronic device of claim 12, where the contact record comprises:
one or more data fields, each data field including a data entry and one or more perimeter accessibility tags,
where a perimeter accessibility tag of the one or more perimeter accessibility tags indicates if the corresponding data entry is accessible from an operation perimeter of the first and second operating perimeters.

17. The electronic device of claim 12, where the requested authorization comprises a password for the second operation perimeter.

18. The electronic device of claim 12, further comprising:
an input operable to receive a requested authorization selected from a group of authorizations consisting of an audio input, a touch input, a motion input, a retina scanner and a fingerprint scanner,
where the processor is operable to determine a validity of the requested authorization.

19. The electronic device of claim 12, further comprising a user interface
operable to display the retrieved first contact information from the at least one storage resource if the electronic device is operated within the first operation perimeter and further operable to display the retrieved second contact information from the at least one storage resource if the electronic device is operated within the second operation perimeter.

20. The electronic device of claim 12, further comprising a user interface operable to display the retrieved first contact information from the at least one storage resource if the electronic device is operated within the first operation perimeter and if the contact record contains no second contact information.

21. A non-transitory computer-readable medium having processor-executable instructions that, when executed by a processor of an electronic device operable within a first operation perimeter and a second operation perimeter, cause the processor to perform operations comprising:

receiving an incoming communication, the incoming communication including a contact identifier of an entity other than a user of the electronic device;

searching a database of contact records of a plurality of contacts, dependent upon the contact identifier, to discover a contact record associated with the entity;

accessing the discovered contact record dependent upon whether the electronic device is operating within the first operation perimeter or the second operation perimeter, the discovered contact record including first contact information of personal contacts of the user accessible from within the first operation perimeter and second contact information of work-related contacts of the user accessible from with the second operation perimeter;

retrieving first contact information and displaying the first contact information to the user of the electronic device if the electronic device is operating within the first operation perimeter; and retrieving the second contact information and displaying the second contact information to the user of the electronic device if the electronic device is operating within the second operation perimeter, where the first operation perimeter is configured for personal activities and personal data of the user, the personal data including the first contact information, and the second operation perimeter is configured for work-related activities and work-related data of the user, the work-related data including the second contact information, and where the first and second operation perimeters operate to prevent the work data from being mixed with the personal data;

the operations further comprising:

if the electronic device is operating within the first operation perimeter;

indicating, via a user interface of the electronic device, that second contact information is available;

if it is determined that the second contact information is to be retrieved;

requesting an authorization for the second operation perimeter;

determining if the authorization is valid and retrieving and displaying the second contact information if the authorization is valid for the second operation perimeter.

* * * * *